United States Patent
Rainville et al.

(10) Patent No.: US 8,277,989 B2
(45) Date of Patent: Oct. 2, 2012

(54) CATHODE FILTER REPLACEMENT ALGORITHM IN A FUEL CELL SYSTEM

(75) Inventors: Joseph D. Rainville, Caledonia, NY (US); Matthew C Kirklin, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 638 days.

(21) Appl. No.: 12/336,166

(22) Filed: Dec. 16, 2008

(65) Prior Publication Data

US 2010/0151294 A1    Jun. 17, 2010

(51) Int. Cl.
*H01M 8/04* (2006.01)

(52) U.S. Cl. ........................................ 429/427; 429/428

(58) Field of Classification Search ................. 429/25, 429/427, 428
See application file for complete search history.

(56) References Cited

U.S. PATENT DOCUMENTS

| 2002/0039672 A1* | 4/2002 | Aramaki | 429/22 |
| 2004/0237513 A1* | 12/2004 | Bunting et al. | 60/295 |
| 2005/0164057 A1* | 7/2005 | Pospichal et al. | 429/25 |

* cited by examiner

*Primary Examiner* — Ula C Ruddock
*Assistant Examiner* — Daniel Gatewood
(74) *Attorney, Agent, or Firm* — John A. Miller; Miller IP Group, PLC

(57) ABSTRACT

A fuel cell system that includes a compressor for providing cathode air to the cathode side of a fuel cell stack and an air filter for filtering the air sent to the compressor to prevent particulates and other contaminants from entering the compressor and the fuel cell stack. The fuel cell system also includes a mass flow meter that measures the flow of air to the compressor and a pressure sensor that measures the pressure of the airflow at the output of the compressor. An electronic compressor map is provided that defines the operating characteristics of the compressor. By knowing the flow through the compressor and the pressure at the outlet of the compressor, an algorithm can determine where on the compressor map the compressor is operating, and from that determine the inlet pressure to the compressor, which in turn shows whether the air filter is clogged or otherwise damaged.

20 Claims, 2 Drawing Sheets

CATHODE FILTER REPLACEMENT ALGORITHM IN A FUEL CELL SYSTEM

BACKGROUND OF THE INVENTION

1. Field of the Invention

This invention relates generally to a system and method for determining when to replace a compressor air filter in a fuel cell system and, more particularly, to a system and method for determining when to replace a compressor air filter in a fuel cell system that uses a compressor map to determine compressor inlet pressure based on the airflow through the compressor and the compressor discharge pressure.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Fuel cell systems typically employ an air filter at the inlet to the cathode compressor to remove contaminants and particulates that would otherwise degrade compressor and fuel cell stack performance. Air filters for fuel cell systems are typically more complex than a typical internal combustion engine air filter, often filtering to HEPA standards of 0.3μ as opposed to 10-15μ for an internal combustion engine air filter. Fuel cell system air filters also typically absorbing various chemicals, such as acid gases and hydrocarbons. Almost all compressors employed as the cathode oxygen provider would be sensitive to inlet flow restrictions caused by a restricted filter, especially a turbo-compressor. If the air filter is restricted, the inlet to the compressor becomes depressed, which limits the fuel cell system's maximum power while consuming additional energy, further reducing performance. Further, for a turbo-compressor, if the air filter fails as a result of being torn or otherwise mispositioned as a result of the force of the compressor air pulling on the air filter, dust and other contaminants that may enter the compressor may damage the compressor and its air bearings.

Currently, without a dedicated compressor inlet pressure sensor, no technique or process is used in the art for detecting when the air filter in the fuel cell system should be replaced, which otherwise might cause compressor failure.

SUMMARY OF THE INVENTION

In accordance with the teachings of the present invention, a fuel cell system is disclosed that includes a compressor for providing cathode air to the cathode side of a fuel cell stack and an air filter for filtering the air sent to the compressor to prevent particulates and other contaminants from entering the compressor and the fuel cell stack. The fuel cell system also includes a mass flow meter that measures the flow of air to the compressor and a pressure sensor that measures the pressure of the airflow at the output of the compressor. An electronic compressor map is provided that defines the operating characteristics of the compressor. By knowing the flow through the compressor and the pressure at the outlet of the compressor, an algorithm can determine where on the compressor map the compressor is operating, and from that determine the inlet pressure to the compressor. The inlet pressure to the compressor can give an indication as to how hard the compressor is working to draw air through the filter, which in turn shows whether the air filter is clogged and should be replaced.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system employing an algorithm for determining when a compressor air filter needs to be changed using a compressor map is merely exemplary in nature, and is in no way intended to limit the invention or its applications or uses.

Figure 1:
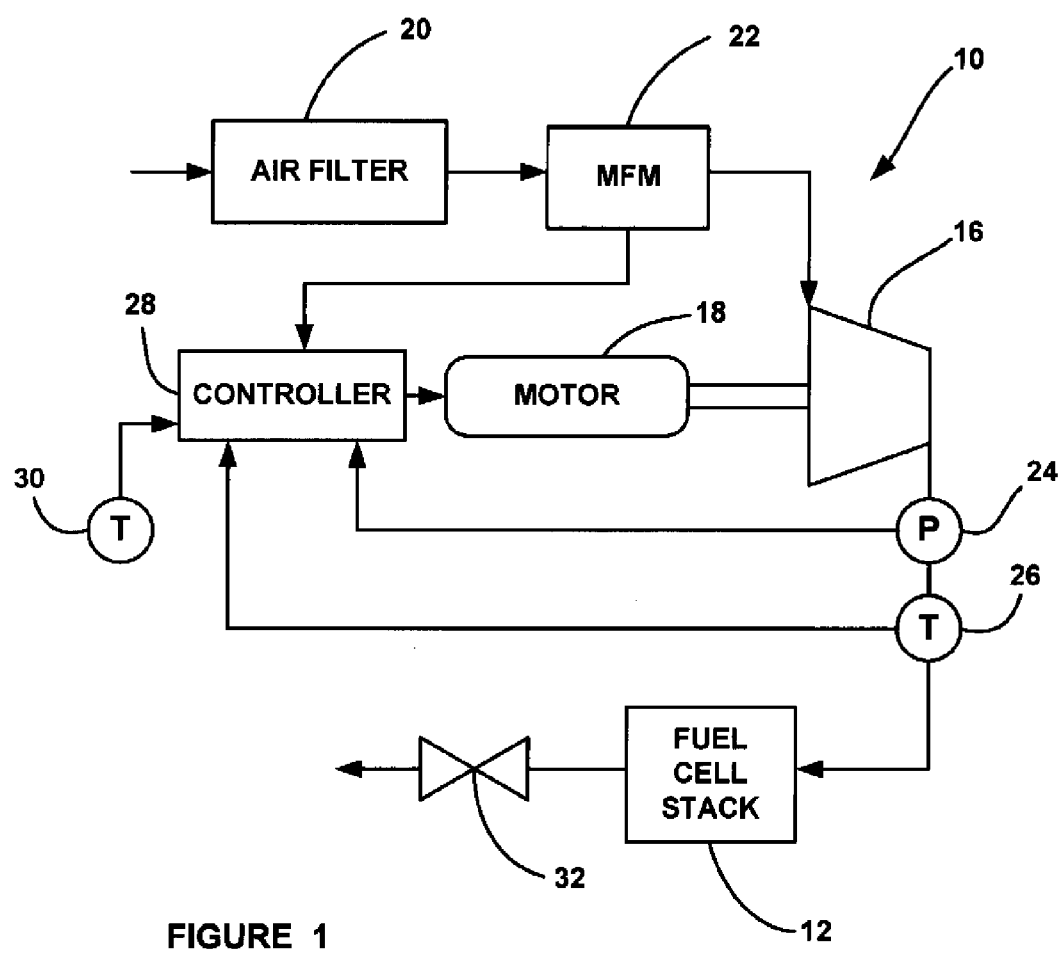
FIG. 1 is a plan view of a fuel cell system that employs an algorithm for determining inlet pressure to a compressor that provides cathode air to a fuel cell stack so as to determine when an air filter filtering the air to the compressor needs to be changed.

FIG. 1 is a plan view of a fuel cell system 10 including a fuel cell stack 12. The fuel cell system 10 can be used for any suitable application, such as on a vehicle or as a distributed generation power system. The system 10 includes a turbo-machine compressor 16 that provides charge air to the cathode side of the stack 12. The compressor 16 can be any suitable turbo-machine type compressor, such as a centrifugal, radial, axial, mixed flow, etc., compressor. This type of compressor is desirable in the system 10 because it is low cost and low weight, and operates with low noise as compared to positive displacement compressors, such as twin-screw compressors. The hydrogen fuel input to the stack 12 is not shown in this diagram. Cathode exhaust, including unused air and water, is emitted from the stack 12 through a cathode exhaust line 14. A back-pressure valve 32 is provided in the exhaust line 14, and is typically used to control stack humidity.

A motor 18 drives the compressor 16 at the appropriate speed to provide the desired amount of charge air to the fuel cell stack 12 for the desired output power. Air from the environment is filtered by an air filter 20 that also reduces compressor whine. The filtered air is sent through a mass flow meter (MFM) 22 that measures the airflow through the compressor 16. A signal indicative of the airflow through the compressor 16 from the MFM 22 is sent to a controller 28. The controller 28 controls the speed of the motor 18 to control the airflow through the compressor 16 so as to provide the proper air stoichiometry for the desired output power of the stack 12. Many factors determine the speed of the compressor 16, including desired output power, ambient temperature, altitude, etc.

It is necessary that the compressor 16 operates on its compressor map of pressure ratio (outlet pressure/inlet pressure) versus airflow. FIG. 1 is a graph with mass flow on the horizontal axis and discharge pressure on the vertical axis showing a typical example of a compressor map 50 for a turbo-machine type compressor. The compressor map 50 includes a series of speed lines 52 that show the relationship between airflow through the compressor 16 and the discharge pressure of the compressor 16 at various compressor speeds. Every compressor can be mapped in this manner. The compressor map 50 is bound by a surge line 54 at which the compressor 16 suffers from an audible flow reversion caused by excessive back-pressure. This back-pressure is generally caused by the pressure drop across the stack 12 and the back pressure valve 32. In other words, excessive back-pressure from the fuel cell stack 12 could cause a compressor surge condition. This surging point or reverse flow of air through the compressor 16 is determined by the speed or RPM of the compressor 16, the system back-pressure, the altitude and the temperature. The map of the pressure ratio is also bound by a choke line 56 where the maximum airflow is reached with minimal pressure for a given compressor speed.

A pressure sensor 24 is provided in an output line from the compressor 16 and measures the outlet pressure of the compressor airflow to the fuel cell stack 12. A pressure signal from the pressure sensor 24 is provided to the controller 28. A temperature sensor 26 can be provided in the output line from the compressor 16 to provide a temperature measurement of the airflow to the fuel cell stack 12. The temperature signal from the temperature sensor 26 is also provided to the controller 28. The temperature of the discharge air from the compressor 16 can be used to provide a correction of airflow density. Further, the system 10 includes an ambient pressure sensor 30 that measures the pressure of the ambient air, which is also provided to the controller 28.

Figure 2:
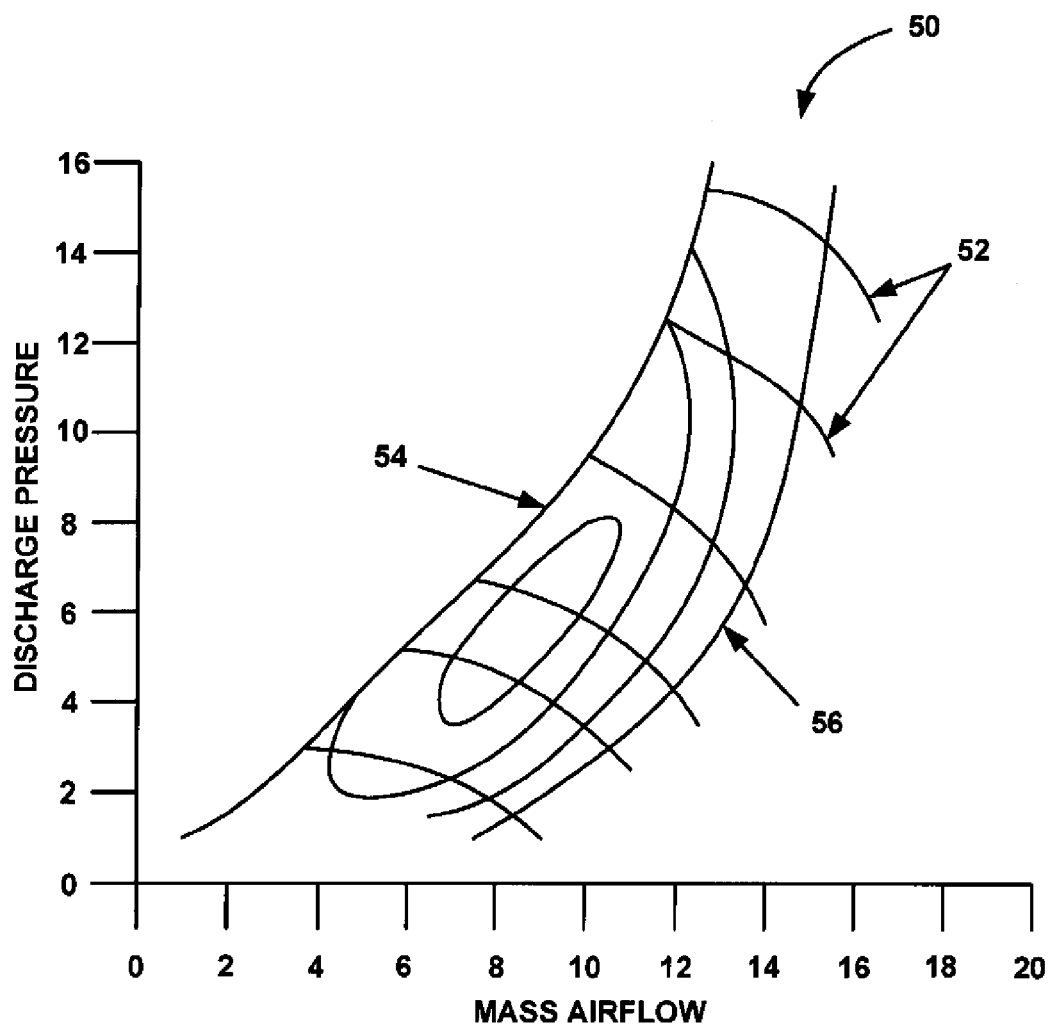
FIG. 2 is a graph with mass airflow on the horizontal axis and discharge pressure on the vertical axis showing a compressor map.

The controller 28 will store an electronic version of the compressor map shown in FIG. 2. Additionally, the controller 28 will know the flow rate to the compressor 16 from the mass flow meter 22, the speed of the compressor 16 from the command given to the motor 18 and the pressure from the pressure sensor 24 at the output of the compressor 16. From this information, the controller 28 determines the location on the map 50 that the compressor 16 is currently operating. Once the location that the compressor 16 is operating on the compressor map 50 is known, the inlet pressure to the compressor 16 can be determined using the compressor map 50. The estimated inlet pressure can then be compared to a threshold to determine if the inlet pressure is depressed as a result of the air filter 20 being clogged or otherwise damaged. In other words, the inlet pressure to the compressor 16 can give an indication as to how hard the compressor 16 is working to draw air through the filter 20, which in turn shows whether the air filter 20 is clogged or otherwise damaged. The threshold can be determined by comparing ambient pressure from the pressure sensor 30 to an acceptable delta pressure limit across the filter 20 for a given compressor speed flow.

The mass airflow meter 22 can be utilized with the compressor outlet pressure and the actual speed of the compressor 16 to derive the compressor inlet pressure. By comparing the calculated compressor inlet pressure to a measured compressor outlet air pressure, the condition of the air filter 20 can be determined with no additional hardware. At a given point in the system start-up or operation of the fuel cell system 10, software can perform a filter check. If a pressure drop across the air filter 20 is approaching a preset limit, a change air filter message can be displayed.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:
1. A fuel cell system comprising:
a fuel cell stack including a cathode input receiving a charge airflow;
a compressor generating the airflow provided to the cathode input of the fuel cell stack;
a motor for driving the compressor;
a mass flow meter receiving the airflow sent to the compressor, said mass flow meter generating an airflow signal indicative of the airflow through the compressor;
a pressure sensor measuring the pressure of the cathode air at an output of the compressor, said pressure sensor generating a pressure signal;
an air filter receiving the air sent to the compressor and filtering the air; and
a controller configured to be responsive to the airflow signal from the mass flow meter and the pressure signal from the pressure sensor, said controller providing a signal to the motor to control the speed of the compressor, said controller digitally storing a compressor map of the operation of the compressor, said controller configured to use the pressure signal, the airflow signal, the speed of the compressor and the compressor map to determine the inlet pressure of the compressor so as to determine the condition of the air filter and whether the air filter should be replaced.

2. The system according to claim 1 wherein the controller compares the inlet pressure to a threshold to determine the condition of the air filter.

3. The system according to claim 2 further comprising an ambient pressure sensor, said controller determining the threshold by comparing the ambient pressure from the pressure sensor to an acceptable delta pressure limit across the air filter for a given compressor speed flow.

4. The system according to claim 1 further comprising an output temperature sensor for measuring the temperature of the airflow from the compressor, said controller also using an output temperature signal from the output temperature sensor to determine the condition of the air filter.

5. The system according to claim 1 wherein the compressor is a turbo-machine compressor.

6. The system according to claim 5 wherein the compressor is selected from the group comprising centrifugal, radial, axial and mixed flow compressors.

7. The system according to claim 1 wherein the fuel cell system is on a vehicle.

8. A fuel cell system comprising:
   a fuel cell stack including a cathode input receiving a charge airflow;
   a compressor generating the airflow provided to the cathode input of the fuel cell stack;
   a motor for driving the compressor;
   an air filter receiving the air sent to the compressor and filtering the air; and
   a controller configured for digitally storing a compressor map of the operation of the compressor, said controller further configured for using the compressor map to determine the inlet pressure of the compressor so as to determine the condition of the air filter and whether the air filter should be replaced.

9. The system according to claim 1 wherein the controller compares the inlet pressure to a threshold to determine the condition of the air filter.

10. The system according to claim 9 further comprising an ambient pressure sensor, said controller determining the threshold by comparing the ambient pressure from the pressure sensor to an acceptable delta pressure limit across the air filter for a given compressor speed flow.

11. The system according to claim 8 further comprising a mass flow meter receiving the airflow sent to the compressor, said mass flow meter generating a signal indicative of the airflow through the compressor, said controller using the mass flow signal to determine where the compressor is operating on the compressor map.

12. The system according to claim 8 further comprising a pressure sensor measuring the pressure of the cathode air at an output of the compressor, said pressure sensor providing a pressure signal, said controller using the pressure signal to determine where the compressor is operating on the compressor map.

13. The system according to claim 8 further comprising an output temperature sensor for measuring the temperature of the air from the compressor, said controller using a temperature signal from the output temperature sensor to determine the condition of the air filter.

14. The system according to claim 8 wherein the compressor is a turbo-machine compressor.

15. The system according to claim 14 wherein the compressor is selected from the group comprising centrifugal, radial, axial and mixed flow compressors.

16. The system according to claim 8 wherein the fuel cell system is on a vehicle.

17. A fuel cell system comprising:
   a fuel cell stack including a cathode input receiving a charge airflow;
   a compressor generating the airflow provided to the cathode input of the fuel cell stack;
   a motor for driving the compressor;
   a mass flow meter receiving the airflow sent to the compressor, said mass flow meter generating an airflow signal indicative of the airflow through the compressor;
   a pressure sensor measuring the pressure of the cathode air at an output of the compressor, said pressure sensor generating a pressure signal;
   an ambient air pressure sensor measuring the temperature of the ambient air and providing an ambient pressure signal;
   an output temperature sensor for measuring the temperature of the airflow from the compressor and providing an output temperature signal;
   an air filter receiving the air sent to the compressor and filtering the air; and
   a controller configured to be responsive to the airflow signal from the mass flow meter and the pressure signal from the pressure sensor, said controller providing a signal to the motor to control the speed of the compressor, said controller digitally storing a compressor map of the operation of the compressor, said controller further configured for using the pressure signal, the airflow signal, the speed of the compressor, the ambient pressure signal, the output temperature signal and the compressor map to determine the inlet pressure of the compressor so as to determine the condition of the air filter and whether the air filter should be replaced, said controller comparing the inlet pressure to a threshold to determine the condition of the air filter, said controller further determining the threshold by comparing the ambient pressure signal to an acceptable delta pressure limit across the air filter for a given compressor speed flow.

18. The system according to claim 17 wherein the compressor is a turbo-machine compressor.

19. The system according to claim 18 wherein the compressor is selected from the group comprising centrifugal, radial, axial and mixed flow compressors.

20. The system according to claim 17 wherein the fuel cell system is on a vehicle.

\* \* \* \* \*